United States Patent [19]
Jackowski et al.

[11] Patent Number: 4,809,273
[45] Date of Patent: Feb. 28, 1989

[54] DEVICE FOR VERIFYING OPERATION OF A CHECKING CODE GENERATOR

[75] Inventors: Stefan P. Jackowski; Ronald B. Jenkins, both of Endicott, N.Y.

[73] Assignee: International Business Machines Corporation, Armonk, N.Y.

[21] Appl. No.: 8,505

[22] Filed: Jan. 29, 1987

[51] Int. Cl.⁴ .............................................. G06F 11/12
[52] U.S. Cl. ......................................... 371/3; 371/37
[58] Field of Search ................... 371/3, 37, 38, 2, 36, 371/39; 364/200, 900, 300, 705

[56] References Cited
U.S. PATENT DOCUMENTS

| | | | |
|---|---|---|---|
| 4,223,382 | 9/1980 | Thorsrud | 371/3 |
| 4,527,269 | 7/1985 | Wood | 371/3 |
| 4,531,213 | 7/1985 | Scheuneman | 371/3 |
| 4,670,876 | 6/1987 | Kirk | 371/3 |

Primary Examiner—Michael R. Fleming
Attorney, Agent, or Firm—Pollock, Vande Sande & Priddy

[57] ABSTRACT

A system for ensuring accurate transmission of data between two functional units. A checking code generator is provided and a device operatively connected to the checking code generator ensures proper operation thereof.

11 Claims, 5 Drawing Sheets

DEVICE FOR VERIFYING OPERATION OF A CHECKING CODE GENERATOR

BACKGROUND OF THE INVENTION

1. Field of the Invention

The present invention relates to a system for detecting errors in digital data transmission and, more particularly, to a system for verifying that the mechanism for detecting errors itself operates properly.

In any digital system in which data is transmitted from one device or functional unit to another, one or more of the data bits in each data word or message may be received in error. This has been a problem since digital data processing systems have existed.

As more sophisticated data processing operations are performed, requiring the use of more complex equipment, there is a greater need for systems to detect and correct errors in data transfer. For example, operations such as merging of files, sorting of data within files, transmission of data to and from remote locations by means of radio broadcast, cables, fiber optics and the like, numerical/statistical analyses, complex data handling procedures and word processing operations require increased reliability in data transfer. In the field of telecommunications and telemetry especially, error rates tend to increase when data is transmitted over analog lines at high baud rates. If data errors occur but are undetected, valuable information and system operation itself may be affected. Thus, error detecting and/or correcting features are not only advantageous for sophisticated systems, they are indispensable to guarantee system integrity.

Systems have been developed to detect errors generated during data transfer. One of the earliest methods for detecting errors was the parity check code. A binary code word has odd parity if an odd number of its digits are 1's. For example, the number 1011 has three 1 digits and therefore has odd parity. Similarly, the binary code word 1100 has an even number of 1 digits and therefore has even parity.

A single parity check code is characterized by an additional check bit that is added to each word to generate either odd or even parity. An error in a single digit or bit in a data word is discernible since the parity check bit associated with that data word is reversed from what is expected. Typically, a parity generator adds the parity check bit to each word before transmission. This technique is called padding the data word. Conventionally, at the receiving functional unit or receiver, the digits in the word are tested. If the parity is incorrect, one of the bits in the data word is considered to be in error. When an error is detected at a receiver, a request for repeat transmission can be given so that the error can be corrected. Only errors in an odd number of digits can be detected with a single parity check, since an even number of errors results in the parity expected for a correct transmission. Moreover, the specific bit in error cannot be identified by the parity check procedure as hereinabove described.

A more sophisticated error detection system was later devised. Data words of a fixed length of bits can be grouped into blocks of a fixed number of data words each. Parity checks can then be performed between different data words as well as for each individual data word. A block parity code can detect many patterns of errors and can be used not only for error detection, but also for error correction when an isolated error occurs in a given row and column of a matrix. While geometric codes are an improvement over parity check bits per se, they still cannot be used to detect errors that are even in number and symmetrical in two dimensions.

After parity check codes and geometric codes were devised, a code was invented by Hamming, after whom it is named. The Hamming code is a system of multiple parity checks that encodes data words in a logical manner so that single errors can be not only detected but also identified for correction. A transmitted data word used in the Hamming code consists of the original data word and parity check digits appended thereto. Each of the required parity checks is performed upon specific bit positions of the transmitted word. The system enables the isolation of an erroneous digit, whether it is in one of the original data word bits or in one of the added parity check bits.

If all the parity check operations are performed successfully, the data word is assumed to be error free. If one or more of the check operations is unsuccessful, however, a single bit error is uniquely determined by decoding so-called syndrome bits, which are derived from the parity check bits.

The Hamming code is only one of a number of codes generically called error correcting codes (ECC's). Codes are usually described in mathematics as closed sets of values that comprise all the allowed number sequences in the code. In data communications, transmitted numbers are essentially random data patterns which are not related to any predetermined code set. The sequence of data, then, is forced into compliance with the code set by adding to it at the transmitter, as hereinabove mentioned. A scheme has heretofore been developed to determine the precise string to append to the original data stream to make the concatenation of transmitted data a valid code. There is a consistent way of extracting the original data from the code value at the receiver and to deliver the actual data to the location where it is ultimately use. For the code scheme to be effective, it must contain allowed values sufficiently different from one another so that expected errors do not alter an allowed value in such a manner that it becomes a different allowed value of the code.

A cyclic redundancy check (CRC) code consists of strings of binary data which, combined with the transmitted data, is evenly divisible by a generator polynomial. The CRC code is a number selected to result in a set of values different enough from one another to achieve a low probability of an undetected error. To determine what to append to the string of original data, the original string is divided as it is being transmitted. When the last data bit is passed, the remainder from the division is the required string that is added since the string including the remainder is evenly divisible by the generator polynomial. Because the generator polynomial is of a known length, the remainder added to the original string is also of fixed length.

At the receiver, the incoming string is divided by the generator polynomial. If the incoming string does not divide evenly, an error is assumed to have occurred. If the incoming string is divided by the generator polynomial evenly, the data delivered to the ultimate destination is the incoming data stripped of the fixed length remainder field.

A longitudinal redundancy code (LRC) is a special case of CRC in which the particular generator polynomial chosen results in the same CRC code as would be obtained by performing an EXCLUSIVE OR operation once for every bit in the data word. If the data stream were represented as a succession of multi-bit words, for example, the LRC code added to the end of the stream would equal the first word EXCLUSIVE ORed with the second, EXCLUSIVE ORed with the third, and so on. When the check is made at the receiver, the result is zero if no errors occurred. This is simply because the EXCLUSIVE OR of any value with itself is zero.

From the foregoing discussion it can be seen that solutions to the problem of erroneous data transmission have conventionally dealt with the symptom rather than the cause. That is, when data is received and determined to be erroneous, the assumption has heretofore been that it is the data that is incorrect. The solution has been to retransmit or modify the data, often using the very same error detection techniques.

If the checking code generator is faulty, however, the same checking code may be generated for the same data message. At best, no progress in finding a remedy for the error is made. Worse, intermittent and unpredictable errors can be generated. Accordingly, the same or other malfunctions are likely to occur. In fact, the most insidious circumstance is one in which data is received erroneously but the checking code indicates the contrary. When this situation occurs, the receiving functional unit and the system connected thereto treat the data as if it were accurate, resulting in potentially serious consequences downstream.

U.S. Pat. No. 4,454,600 issued to LeGresley teaches the use of a circuit for generating CRC codes. It is cited herein as an example of many types of CRC generator circuits currently used.

U.S. Pat. No. 4,520,481 issued to Israel teaches the use of a CRC circuit for detecting malfunctioning units.

U.S. Pat. No. 4,312,068 issued to Goss et al teaches a method of comparing CRC codes that are generated both by the transmitter and by the receiver to ensure proper data transmission.

U.S. Pat. No. 4,422,067 issued to Clark et al discloses a cyclic redundancy checker that ceases to function upon certain conditions, thereby causing an associated circuit to de-energize a load in a control system.

U.S. Pat. No. 3,889,109 issued to Blessin teaches the use of a testing mechanism to verify operation of send control logic and receive control logic. During testing operations, a communications subchannel is configured in a so-called wraparound mode so that data sent from a processor is routed through the send control logic and the receive control logic back to the processor. A CRC check is performed on the return data to determine if errors are present. If so, the send control logic and the receive control logic can be selectively bypassed to aid in determining where the error originated.

Each of the aforementioned systems can detect an error not due to a defect in data, but due to a defect in the checking code appended thereto. Moreover, an error in data may occur but, due to a defect in the appended checking code, the error may not be detected by any of these systems. Such a situation can occur if the checking code generator malfunctions or is defective.

It would be advantageous to provide a system for ensuring correct data transmission between two functional units.

It would also be advantageous to provide a system for ensuring that checking codes themselves are generated properly.

It would also be advantageous to provide a system for verifying proper operation of a checking code generator by the exercise thereof.

It would further be advantageous to provide a system for exercising checking code generators at either or both ends of a transmission link.

It would also be advantageous to provide a system whereby a comparator is used to compare checking codes generated by each of the devices in communicative relationship with one another.

It would further be advantageous to provide a system for indicating whether a checking code generator is operating properly.

SUMMARY OF THE INVENTION

In accordance with the present invention, there is provided a system for ensuring accurate transmission of data between two functional units. The system includes a checking code generator and a device operatively connected to the checking code generator for ensuring proper operation thereof.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

Figure 1:
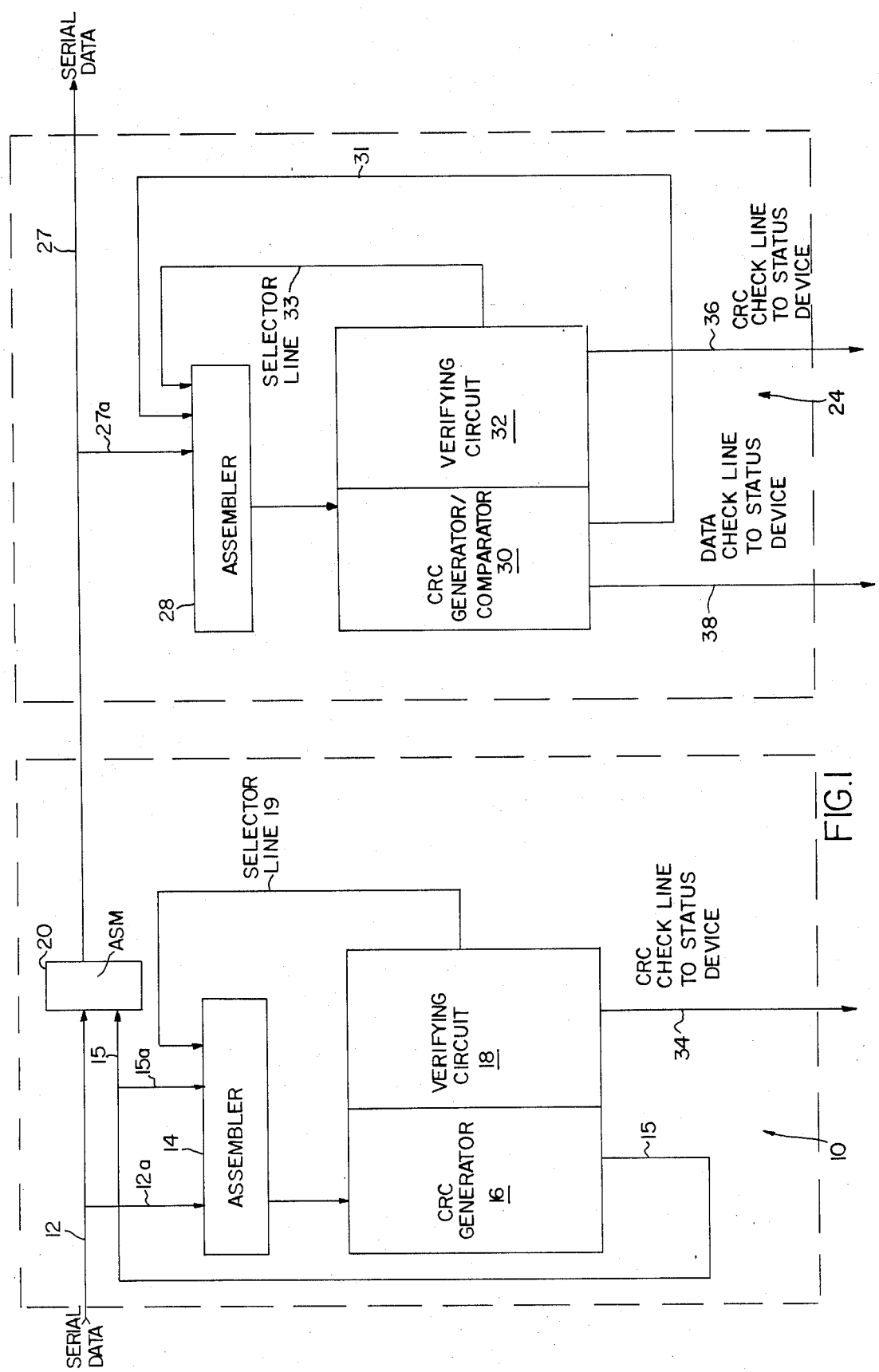
FIG. 1 is a block diagram of a system configuration for use with serial data in accordance with the present invention.

Referring now to FIG. 1, there is shown a block diagram of a system configuration for use with serial data in accordance with the present invention.

A first functional unit is shown outlined in phantom and referred to generally as reference numeral 10. The first unit 10 is connected to a data line 12 for receiving serial data therefrom.

The data from the data line 12 is channeled to an assembler 14 via line 12a. The assembler 14 consists of one or more gates, not shown, for selecting data from a plurality of input sources. The assembler 14 passes the data from the data line 12 via line 12a to a serial cyclic redundancy checking (CRC) code generator 16. The CRC code generator 16 processes the data and generates a CRC code transmitted via line 15 to be appended to the data, as hereinbelow further described. Connected to the CRC code generator 16 is a verifying circuit 18 for gating data through the assembler 14 via a selector line 19. Thus, the verifying circuit 18 via line 19 can gate either the code from the CRC code generator 16 via line 15a or the data from the data line 12 via line 12a through the assembler 14.

A second assembler 20 is connected to both the data via line 12 and the CRC code generator 16 via line 15 and can received data directly from either source. The assembler 20 appends the CRC code generated by device 16 to the data received from the data via line 12.

A second functional unit, outlined in phantom and referred to generally as reference numeral 24, receives data from assembler 20 via line 27. The data via line 27 is channeled into an assembler 28 via line 27a and thence to a second serial CRC code generator and comparator 30. Connected to the CRC code generator and comparator 30 is another verifying circuit 32. The circuit 32 can gate via selection line 33 either data from the data line 27 or a code generated by the CRC code generator and comparator 30 via line 31 through the assembler 28.

A CRC check line 34 in the first functional unit 10 is provided from the first verifying circuit 18 to a status device, not shown. Similarly, a CRC check line 36 in the second functional unit 24 is connected from the second verifying circuit 32 to a status device, not shown. Finally, a data check line 38 is connected to the CRC code generator and comparator 30 and to another status device, not shown. The status devices determine whether the circuits 18, 32 and devices 16 and 30 are functioning.

Figure 2:
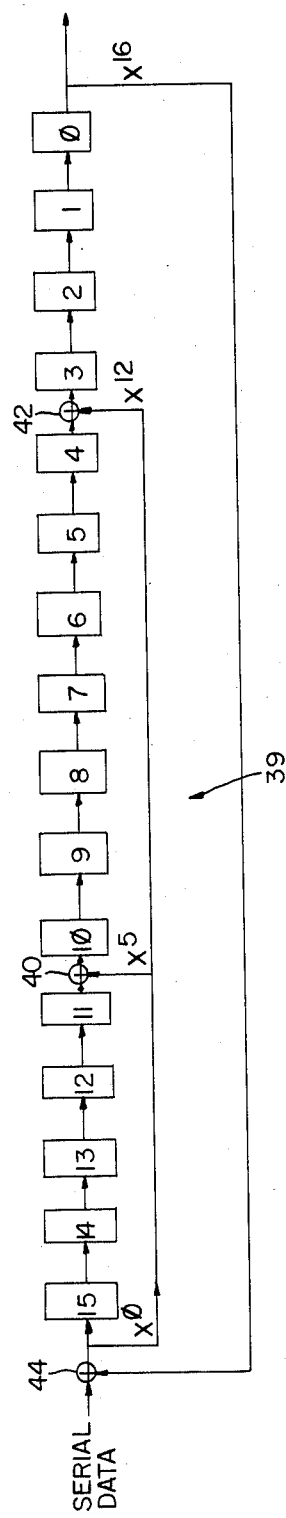
FIG. 2 is a block diagram showing a serial CRC code generator circuit.

Referring now also to FIG. 2 there is shown a typical serial CRC code generator circuit 39, such as is used in the first functional unit 10 (reference number 16) and in the second functional unit 24 (reference numeral 30). The circuit 39 has provision for 16 bits numbered 0-15. There are provided EXCLUSIVE OR inputs to bit 15, bit 10 and bit 3 in the preferred embodiment in accordance with a specified generator polynomial, as hereinbelow described. It should be understood, however, that depending upon the generator polynomial implemented, any other bit or bits can have inputs in such a CRC code generator circuit. The CRC code generator circuit need not be limited to a width of 16 bits. EXCLUSIVE OR gates are shown between bits 10 and 11 at reference numeral 40 and between bits 3 and 4 at reference numeral 42. Moreover, an EXCLUSIVE OR gate 44 can be used to EXCLUSIVE OR the serial data being input and the CRC output from bit 0.

Figure 3:
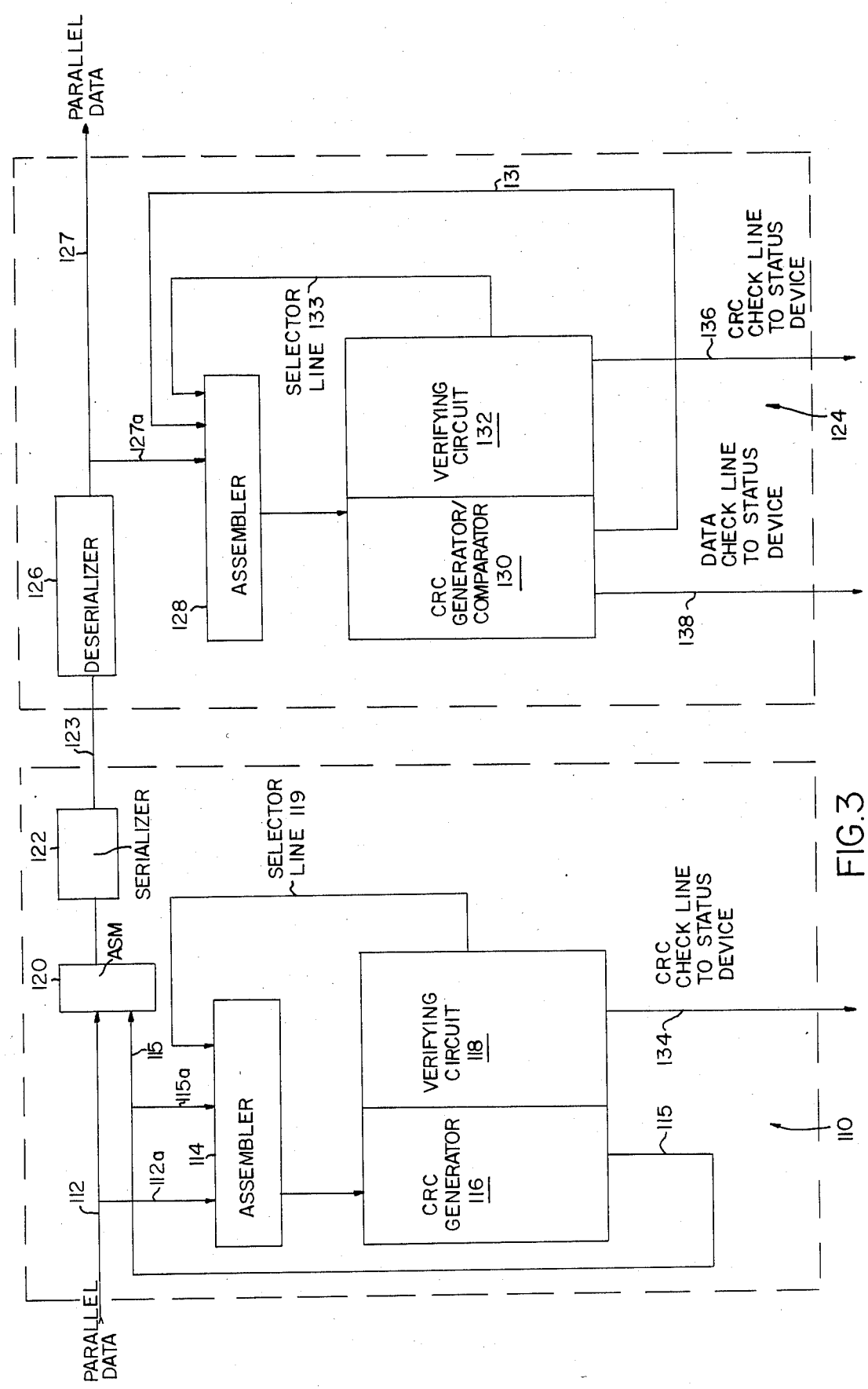
FIG. 3 is a block diagram of a system configuration for use with parallel data.

Referring now also to FIG. 3, there is shown a block diagram of an alternate system configuration for use with parallel data in accordance with the present invention.

A first functional unit is shown outlined in phantom and referred to generally as reference numeral 110. The first unit 110 is connected to a data line 112 for receiving data therefrom. The data line 112 in the preferred embodiment has eight separate lines, not shown, so that data can be transmitted in parallel mode. The eight data lines allow eight bits (one byte) of data to be transmitted simultaneously.

The data from the data line 112 is channeled to an assembler 114 via line 112a. The assembler 114 consists of one or more gates, not shown, for selecting data from a plurality of input sources. The assembler 114 passes the data from the data line 112 via line 112a to a parallel CRC code generator 116. The CRC code generator 116 processes the data and generates a CRC code transmitted via line 115 to be appended to the data, as hereinbelow further described. Connected to the CRC code generator 116 is a verifying circuit 118 for gating data through the assembler 114 via a selector line 119. Thus, the verifying circuit 118 via line 119 can gate either the code from the CRC code generator 116 via line 115a or the data from the data line 112 via line 112a through the assembler 114.

A second assembler 120 is connected to both the data via line 112 and the CRC code generator 116 via line 115 and can receive data directly from either source. The assembler 120 appends the CRC code generated by device 116 to the data received from the data via line 112. This appended data signal is now transmitted to a serializer 122 which converts eight lines of data into one line 123 for serial transmission.

A second functional unit, outlined in phantom and referred to generally as reference number 124, has a deserializer 126 connected to the line 123 to convert the serial line of data into eight parallel lines, shown as reference numeral 127. The data from the deserializer 126 is channeled into an assembler 128 via line 127a and thence to a second parallel CRC code generator and comparator 130. Connected to the CRC code generator and comparator 130 is another verifying circuit 132. The circuit 132 can gate via selector line 133 either data from the data line 127a from the deserializer 126 via line 127a or a code generated by the CRC code generator and comparator 130 via line 131 through the assembler 128.

A CRC check line 134 in the first functional unit 110 is provided from the first verifying circuit 118 to a status device, not shown. Similarly, a CRC check line 136 in the second functional unit 124 is connected from the second verifying circuit 132 to a status device, not shown. Finally, a data check line 138 is connected to the CRC code generator and comparator 130 and to another status device, not shown. The status devices determine whether the circuits 118, 132 and devices 116 and 130 are functioning.

Figure 4:
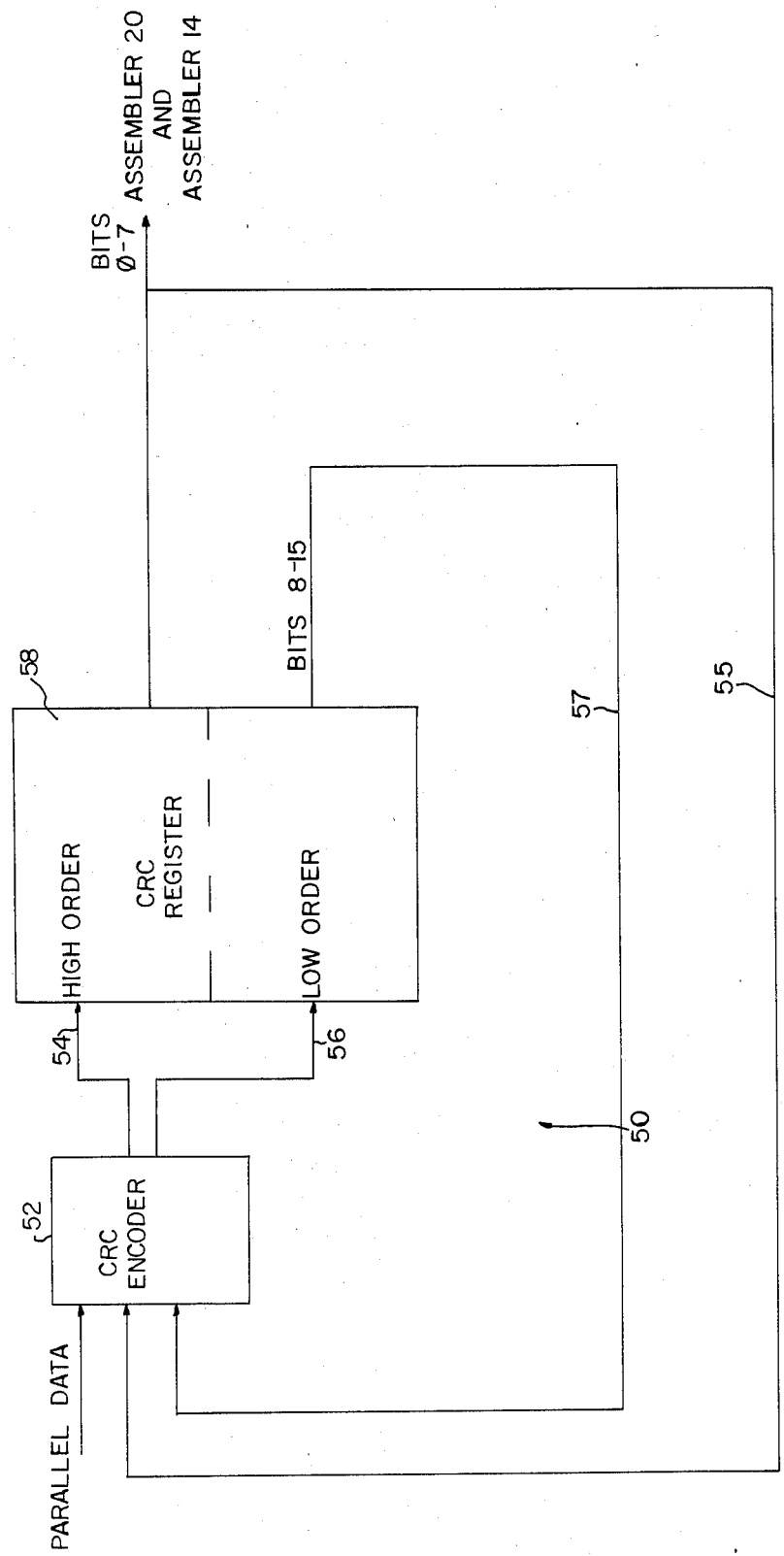
FIG. 4 is a block diagram showing a parallel CRC code generator circuit.

Referring now also to FIG. 4, there is shown an embodiment of a parallel CRC code generator circuit, identified generally as reference numeral 50. Data in parallel form is input to a CRC code generator or encoder 52 from which the high order byte (bits 0-7) 54 and low order byte (bits 8-15) 56 of the CRC code are output. The high order byte 54 and low order byte 56 are input to a CRC register 58. The output from the CRC register 58 is, in turn, re-input to the CRC code encoder 52 by means of feedback lines 55 and 57. The high order byte 54 generated by the CRC code encoder 52 is stored in the CRC register 58 and thence output to the assembler 120 (FIG. 3). The low order byte 56 that is stored in the CRC register 58 is returned to the CRC code encoder 52 via feedback line 57. The high order byte 54 is also sent from the CRC register 58 to the CRC code encoder 52 via feedback line 55.

The CRC code encoder 52 performs the function of a register, and consists of circuitry, not shown, which implements the predetermined parallel CRC equations hereinbelow described.

It should be understood that the parallel CRC code generator circuit 50 (FIG. 4) is actually the CRC code generator 116 and part of the verifying circuit 118 shown in FIG. 3. If the serializer 122 and deserializer 126 were not part of the system, the parallel data from assembler 120 could be passed directly to parallel data line 127. It can also be seen that by moving the serializer 122 to the front end of the first functional device 110 and moving the deserializer 126 to the back end of the second functional device 124, a serial CRC code generator circuit 50, as implemented in FIG. 1, can be used.

The generator polynomial shown in the example of a serial CRC code generator 39 (FIG. 2) is as follows:

$$X^{16}+X^{12}+X^5+1$$

In the aforementioned polynomial equation, X represents a dummy variable. If another polynomial is used, the circuit 39 must be modified appropriately.

In operation, after all data has been shifted through the CRC code generator circuit 39, the value in the shift register is the remainder of the division of the data by the polynomial. This is the CRC code for the data stream. The CRC code can be concatenated onto the end of the transmitted data and checked when received by the second functional unit 24 (FIG. 1). For a parallel data stream one byte wide, a parallel CRC code generator circuit 50 (FIG. 4) is designed by performing a look-ahead of eight shifts on the serial shift register 39 (FIG. 2) as hereinabove described. Parallel CRC equations are thus generated for the value of each bit in the CRC code as if eight serial shifts of the data stream have actually occurred. For this example, the resulting equations are generated:

High-Order CRC Byte
$$\begin{cases} CRC(0) = R_0 \oplus D_0 \oplus R_4 \oplus D_4 \oplus R_8 \\ CRC(1) = R_1 \oplus D_1 \oplus R_5 \oplus D_5 \oplus R_9 \\ CRC(2) = R_2 \oplus D_2 \oplus R_6 \oplus D_6 \oplus R_{10} \\ CRC(3) = R_0 \oplus D_0 \oplus R_3 \oplus D_3 \oplus R_7 \oplus D_7 \oplus R_{11} \\ CRC(4) = R_1 \oplus D_1 \oplus R_{12} \\ CRC(5) = R_2 \oplus D_2 \oplus R_{13} \\ CRC(6) = R_3 \oplus D_3 \oplus R_{14} \\ CRC(7) = R_0 \oplus D_0 \oplus R_4 \oplus D_4 \oplus R_{15} \end{cases}$$

Low-Order CRC Byte
$$\begin{cases} CRC(8) = R_0 \oplus D_0 \oplus R_1 \oplus D_1 \oplus R_5 \oplus D_5 \\ CRC(9) = R_1 \oplus D_1 \oplus R_2 \oplus D_2 \oplus R_6 \oplus D_6 \\ CRC(10) = R_2 \oplus D_2 \oplus R_3 \oplus D_3 \oplus R_7 \oplus D_7 \\ CRC(11) = R_3 \oplus D_3 \\ CRC(12) = R_0 \oplus D_0 \oplus R_4 \oplus D_4 \\ CRC(13) = R_1 \oplus D_1 \oplus R_5 \oplus D_5 \\ CRC(14) = R_2 \oplus D_2 \oplus R_6 \oplus D_6 \\ CRC(15) = R_3 \oplus D_3 \oplus R_7 \oplus D_7 \end{cases}$$

where CRC(n) represents the next CRC value to be loaded into CRC register 58 (FIG. 4), $R_m$ represents the present CRC value in register 58, and $D_i$ represents a data value from assembler 114 (FIG. 3).

The aforementioned equations indicate that the CRC code equals 00 00 in hexadecimal notation if the previous two data bytes sent through the CRC code generator circuit 50 (FIG. 4) or 39 (FIG. 2) were identical in value to the contents of the CRC code immediately before they were processed. When the first data byte—identical to the high order CRC—byte—is processed, the next low order CRC byte equals 00 and the next high order CRC byte equals the value in the previous low order byte. As an example, if the present CRC value is A7 E8 in hexadecimal notation and the data byte is A7, then the next CRC value is E8 00. If the next data byte is E8, the resulting CRC value is equal to 00 00.

Figure 5:
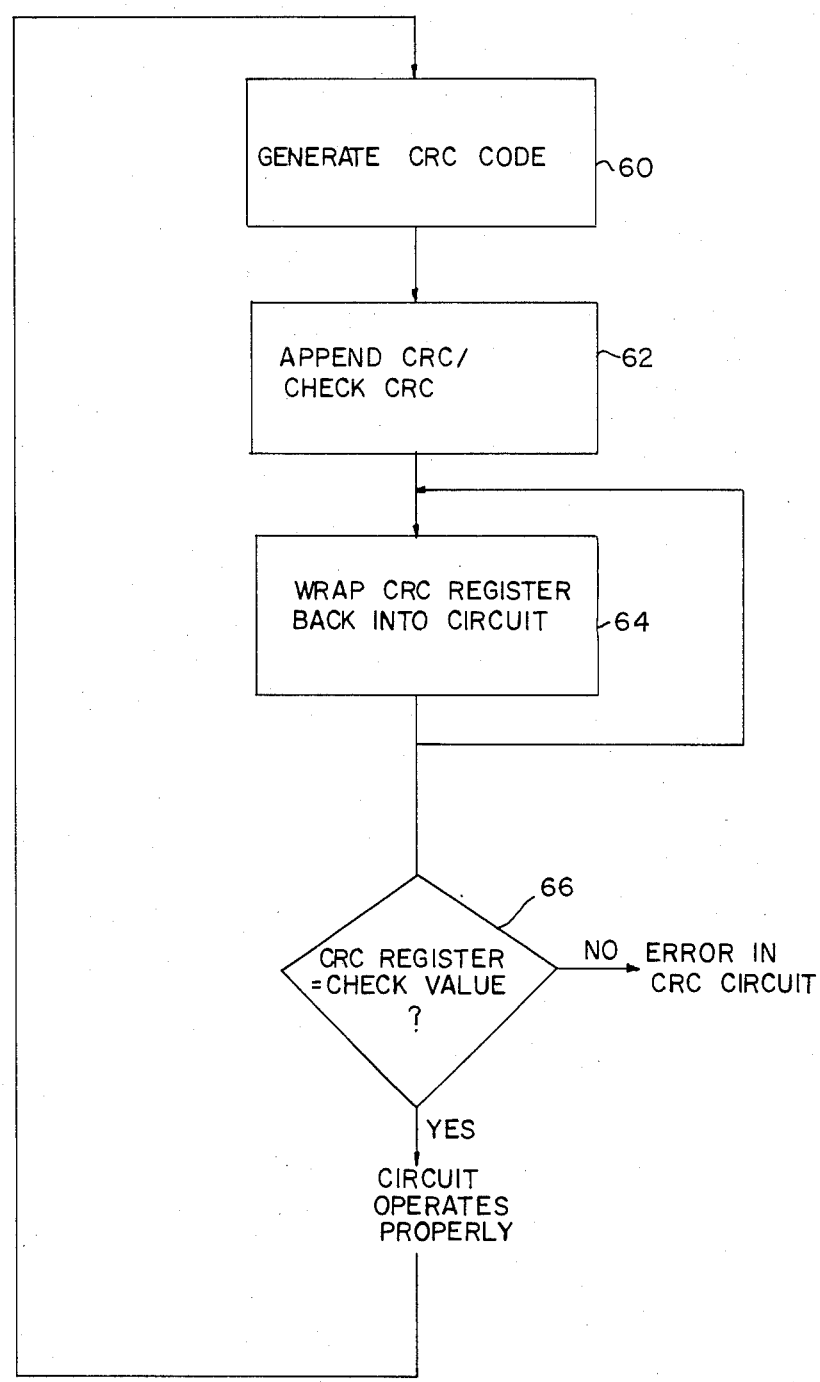
FIG. 5 is a flow chart of operation in accordance with the present invention.

Referring now also to FIG. 5, there is shown a flow chart of operation. A CRC code is first generated, step 60, for a data stream. The CRC code is then appended to the data stream, step 62. The aforementioned two steps 60 and 62 need not be performed to verify proper CRC code generator circuit operation. For a parallel CRC code generator circuit 50 (FIG. 4), self checking is accomplished by wrapping the high order CRC byte 55 back into the circuit 50 at assembler 114 (FIG. 3), step 64, for as many clock cycles as there are bytes or fractions thereof in the CRC code. For the aforementioned example, the high order CRC byte 55 is wrapped back twice since there are 16 bits (2 bytes) in the CRC code. If there were 17 to 24 bits in the CRC code (three bytes or fractions thereof), wrapping would have to occur three times and so on. The parallel mode need not be performed in full bytes. For example, four-bit blocks could be wrapped back four times in accounting for a 16-bit wide CRC code or eight times for a 32-bit wide CRC code, and so on. The parallel CRC equations would be modified accordingly.

For a serial CRC code generator circuit 39 (FIG. 2), self checking is accomplished similarly, but on a bit by bit basis. The individual CRC bits are wrapped back into the circuit 39 by way of assembler 14 (FIG. 1), starting with bit 0.

For either parallel or serial CRC code generator circuits 50 or 39, respectively, the resultant CRC value equals 00 00, step 66, if the circuit operates properly. The system then continues operation at step 60 for the next data stream.

It is possible to invert or otherwise alter the CRC register values before wrapping into the assembler 14 or assembler 114 (FIG. 3). In that case, the check value representing proper operation will not necessarily be a CRC value equal to 00 00.

It is important that self checking does not occur during transmission or reception of an actual data stream or the CRC code for that data stream will be altered. Thus, it is preferred to check the CRC circuit 39 or 50 either immediately after a CRC code is generated and transmitted across the interface separating the two functional units 10, 14 or 110, 124 or immediately after a CRC code is checked after reception across the interface.

When receiving the CRC code, self checking aids in isolating actual errors. If an error is discovered in the actual CRC code, it may mean that a transmission error occurred on the interface. If, however, the subsequent self check indicates that a hardware error occurred, the CRC circuitry 39 or 50 is most likely in error and the interface may be operating properly.

During data transmission, a self check can occur immediately after the CRC code is generated and transmitted at the end of the data stream. In this case, the self check indicates that the transmitted CRC code may be in error; action can be taken to minimize the effect thereof.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. In a system for transmitting data from one functional unit to another functional unit, an apparatus for ensuring accurate transmission of said data comprising:
a checking code generator at said one functional unit for generating a checking code from said data for appending to said data for transmission with said data to said another functional unit;
a first assembler means at said one unit for appending said checking code to said data;
a second assembler means at said one unit for receiving said data and said checking code and applying either of said data or checking code to said checking code generator as an input signal; and,
a verifying circuit connected to sequentially enable said second assembler to apply said data and checking code to said checking code generator, and to generate a status signal indicating whether said checking code generator, when receiving a checking code as an input, produces a predetermined checking code.

2. The system in accordance with claim 1 wherein said verifying circuit converts a checking code generated by said checking code generator to data for further processing thereof in order to exercise said checking code generator.

3. The system in accordance with claim 1 further comprising:
(c) a comparator for comparing each of the checking codes generated by said checking code generating means with one another.

4. The system in accordance with claim 3 further comprising:
(d) indicator means operatively connected to said comparator for indicating whether said checking code generator is operating properly.

5. The system in accordance with claim 1 wherein said converts a checking code generated by said checking code generator to data for further processing thereof in order to exercise said checking code generator.

6. In a system for transferring a data signal having a CRC checking code appended thereto, an apparatus for verifying the operation of a checking code generator comprising:
(a) an assembler unit for selectively applying either said data signal or a generated checking code to said checking code generator;
(b) verifying circuit means connected to said checking code generator output for determining whether said checking code generator is producing a predetermined output signal when receiving a checking code as an input; and
(c) means connected to said verifying circuit for indicating an error when said verifying circuits does not determine said predetermined output signal is present.

7. The system in accordance with claim 6 wherein said verifying circuit means is adapted to exercise said checking code generator.

8. The system in accordance with claim 6 wherein said verifying circuit means is adapted to convert a checking code generated by said checking code generator to data for further processing thereof in order to exercise said checking code generator.

9. The system in accordance with claim 6 further comprising:
(c) a comparator for comparing each of the checking codes generated by the checking code generating means with one another.

10. The apparatus of claim 6 wherein said verifying circuit supplies a control signal to said assembler for applying said generated checking code to said checking code generator following a transmission of said data and appended checking code.

11. The apparatus of claim 6 wherein said assembler unit is also capable of applying a data signal with an appended checking code as an input signal to said checking code generator.

* * * * *